July 7, 1931.  H. H. HERBOLD  1,813,291
AUTOMATIC WOOD SAWING MACHINE
Filed April 5, 1927   2 Sheets-Sheet 1
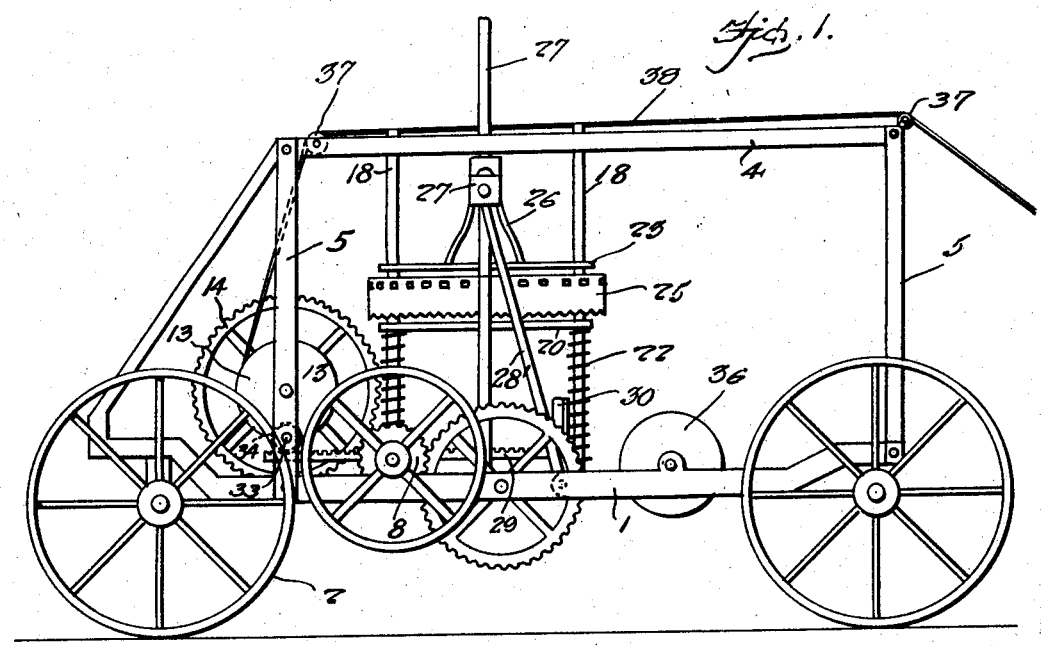
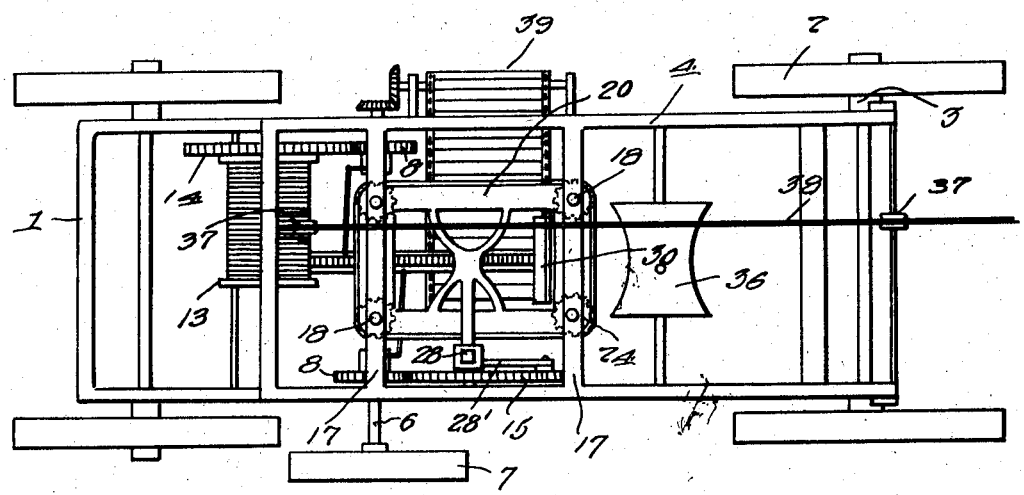
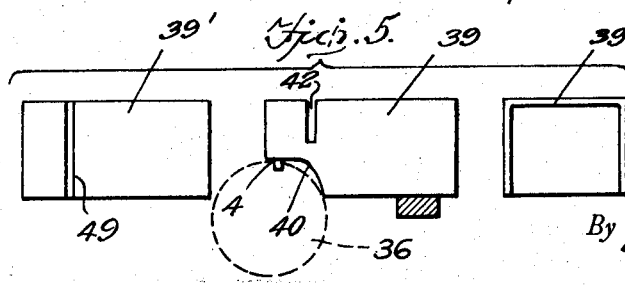
Inventor
H. H. Herbold
By Clarence A. O'Brien
Attorney July 7, 1931.  H. H. HERBOLD  1,813,291
AUTOMATIC WOOD SAWING MACHINE
Filed April 5, 1927   2 Sheets-Sheet 2
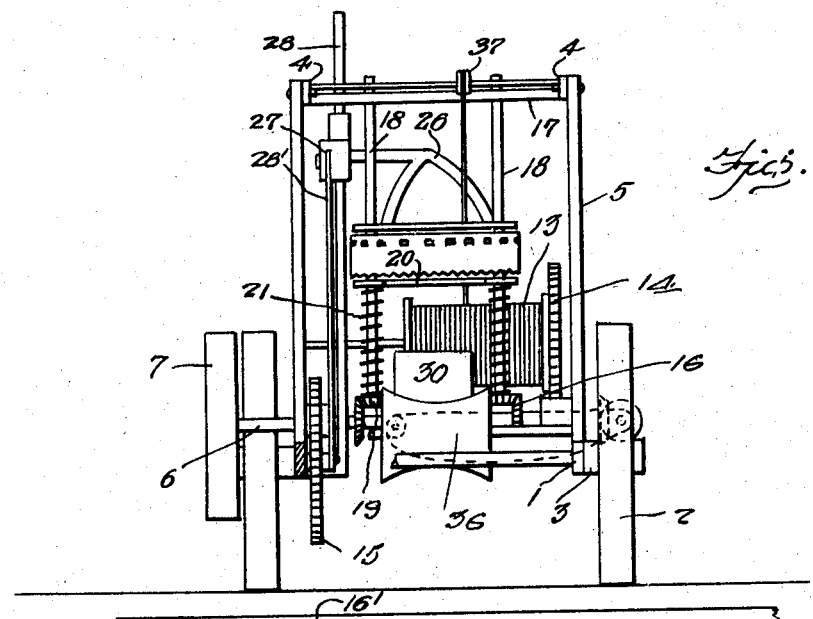
Fig. 3.
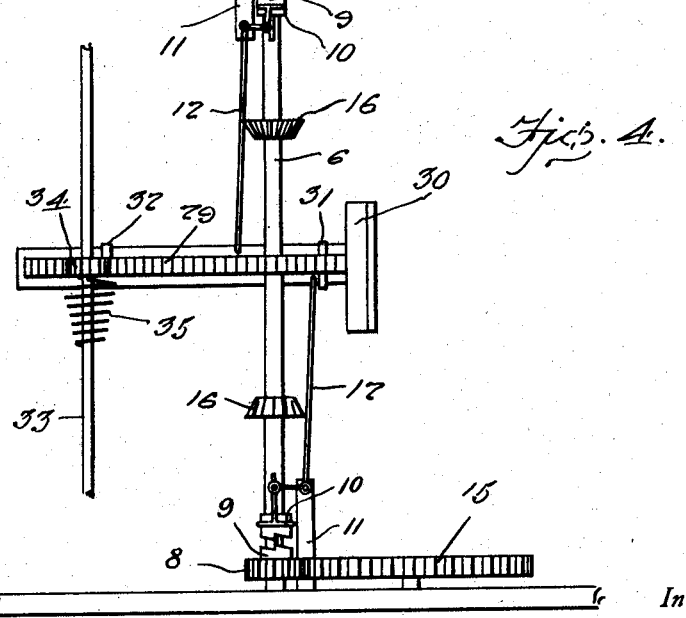
Fig. 4.
Inventor
H. H. Herbold
By Clarence A. O'Brien
Attorney Patented July 7, 1931

1,813,291

UNITED STATES PATENT OFFICE

HENRY HERMAN HERBOLD, OF THAYER, MISSOURI

AUTOMATIC WOOD-SAWING MACHINE

Application filed April 5, 1927. Serial No. 181,154.

The present invention relates to automatic wood sawing machines and is especially adapted for sawing logs or large pieces of timber in predetermined lengths.

The invention consists briefly of the supporting frame, which may be wheeled, a super frame, and a band saw mechanism supported by said frame.

The invention further includes means whereby this band saw mechanism is operated in a horizontal plane and supported in such a manner as to render the same capable of being automatically elevated and lowered in accordance with the motion of the material to be cut. A drum supported by the frame is cooperative with the band saw mechanism in feeding the material to a position under the saw and then lowering the saw to cutting relation with the material.

A prime object of this invention is to provide a machine of the above character, which includes means whereby a feeding mechanism and an operating saw may be alternately brought into operation for the purpose of severing logs or other material into predetermined lengths without the necessity of manually gauging these operations.

Another object is to provide an automatic wood sawing machine including the main power shaft, to which the feeding mechanism and the saw mechanism may be alternately connected for performing their respective functions.

Still another object resides in providing in conjunction with the above means, novel means cooperative with the foregoing mechanism, whereby the sawed lengths of wood may be readily conveyed to a point at one side of the present machine.

Other very novel objects and advantages will readily become apparent as the invention is better understood from the specification and claims to follow.

In the drawings:

Figure 1 shows a side elevation of the machine in its entirety.

Figure 2 represents a top plan view of the machine as disclosed in Figure 1.

Figure 3 represents a rear end view of the machine in partial fragmentary view, with the conveyor and its supporting means removed.

Figure 4 is an enlarged fragmentary view of the clutch mechanism, and shows the rack in log projected position.

Figure 5 discloses an attachment which may be employed, when sawing boards or other milling products, said figure showing the attachment in top, side and end elevations.

Now for a more specific description of this invention, reference is made to the drawings, wherein like numerals designate like parts. This machine includes a sub-frame 1, which may also be regarded as a chassis and supported upon wheels 2, which wheels are preferably connected to said chassis by suitable stub axles 3. Above the sub-frame or chassis of this machine is supported, a superframe 4, supported upon the sub-frame by a plurality of posts 5.

A main drive shaft 6, has its ends journaled in the opposite sides of the sub-frame, and in transverse respect thereto. This shaft as shown clearly in Figure 4 of the drawings, projects beyond the frame at one side, for receiving the drive pulley 7. Obviously, this machine may be drawn by a tractor, if desired, in which case, the drive shaft 6, could receive its power from the tractor. On the other hand, a suitable engine could be associated with the drive shaft in any manner found most suitable and efficient in driving the same. Freely rotatable on the drive shaft and inwardly from each journaled end portion thereof is a pinion gear 8, provided with an inwardly projecting clutch collar 9. Inwardly from each pinion, a clutch collar 10 is splined on the shaft 6. A supporting arm 11 projects inwardly from each side of the sub frame 1, adjacent to the shaft 6. Upon each of these supporting arms, an L-shaped lever 12 is supported and pivotally connected at its heel portion. The end of the shorter leg portion of each L-shaped arm is pivotally connected to its adjacent clutch collar 10, while the elongated leg portions of the arms project inwardly and terminate in adjacent spaced relation.

A cable drum 13 is supported on a shaft, journalled between posts 5 at the one end of the machine. This drum is provided with a gear 14, at one end thereof, which is adapted for normal meshed relation with the adjacent pinion 8 on the drive shaft 6. Obviously, when the arm 12 associated with this particular pinion is moved away from the shaft 6, the clutch collar 10 is disengaged from the ratchet collar 9 of the pinion and the pinion allowed to idle on the shaft. At the opposite side of the sub frame and at the opposite end of the shaft 6, a gear wheel 15 is rotatable on a stub shaft 15' projecting from the frame. The gear wheel 15 is adapted for normal meshed relation with the adjacent pinion 8, which pinion is allowed to idle on the shaft 6, when the elongated leg portion of the arm 12 controlling the clutch thereof is moved away from the shaft 6. Furthermore, a pair of bevel gears 16—16 are keyed to the shaft 6, in spaced relation to each other.

Spanning the super frame transversely is a pair of cross bars 17—17, each of which is adapted to journally receive the upper end portions of two pairs of vertical shafts 18. The lower end portions of one transversely spaced pair of the shafts 18 have keyed thereto the bevelled gears 19, for constant meshed relation with the bevelled gears 16 on the shaft 6. A U-shaped plate 20 is apertured, at its end and corner portions for slidable engagement on the shafts 18. Each shaft 18 is provided with a coiled spring 22 thereon, below the plate 20 and is adapted for tensional engagement therewith.

It can be seen that the plate 23 serves to feed the saw downwardly when the cross head is actuated, so as to engage the work, the spring 22 being adapted to return the cord to the elevated position shown in Fig. 4 when the upper plate 23 is released.

Interconnecting the respective vertical shafts and slidable thereon is a U-shaped plate 23, disposed above the U-shaped plate 20. Between the respective slidable plates on the vertical shaft, each shaft is provided with a sprocket wheel 24, while trained around these sprockets and in horizontal plane is a band saw 25, which saw is toothed at its lower edge, while its upper edge portion is circumferentially formed with spaced perforations to receive the teeth of the sprocket wheels. In the proper operation of this device, the sprockets of the rearward vertical shafts will be freely rotatable on their respective shafts, while the sprockets of the forward vertical shafts will be splined to their respective shafts, so that the rotation of the forward shafts will transmit linear movement to the saw band.

A spider 26 upstanding from the U-shaped plate 23 has its upper portion diverged toward one side of the machine and provided with a cross head construction 27. A vertical guide bar 28 is supported at its lower end to the sub frame and is adapted to have the cross head 27 slidable thereon. The gear wheel 15 on the sub frame is adapted to have the lower end of the connecting rod 28' eccentrically connected thereto, while the upper end of the connecting rod is pivotally connected to the cross head 27.

Suitably supported between the sides of the sub-frame, a rack bar 29 is provided at its one end with an enlarged head 30. Inwardly from the opposite end of the rack 29 a pintle 31 projects at each side of the rack, while at the rear end of the rack, still another pintle 32 projects at one side of the rack. A fixed shaft 33 has its respective ends secured to the opposite sides of the sub-frame, while a pinion 34 is freely rotatable on the intermediate portion thereof. This pinion is normally meshed with the rack 29 and is adapted to normally urge the rack rearwardly as a result of the connection of the spring 36 between the shaft 33 and the pinion.

At the rearward end portion of the machine, a channeled roll 36 is rotatably supported on a shaft, connected to the sub-frame in the manner shown in the drawings. As is clearly shown in Figure 1 of the drawings, the super-frame is provided with a pulley 37, fore and aft, for the purpose of receiving the log holding rope or cable 38, adapted to be wound at one end of the drum 13.

In the operation of this machine, when a suitable power source is connected with the pulley 7 of the main drive shaft 6, the latter shaft is rotated. Due to the normal rearward disposition of the rack 29, the pintle 32 will be in engagement with the arm 12, obviously causing a positive driving connection between the shaft 6 and the gear 14 of the drum. This will cause the winding of the cable 38 onto the drum and the hauling of a log toward the rearward end of the machine. When the log has been drawn to a point immediately at the rear of the machine, the forward end of the log may be lifted onto the roller 36, and the cable connected to the rear end of the log. By the further winding of the drum, the forward end of the log will be caused to engage the head 30 of the rack 29, which will cause the rack to move inwardly and result ultimately in the engagement of the pintles 31 with the respective arms 12—12. By this engagement, the pinion 8 in mesh with the drum gear will become idle, while the pinion in mesh with the gear wheel 15 will positively connect the shaft 6 and gear 15 in driving relation. Obviously, at this point, the movement of the log has ceased and by the rotation of the gear 15, the cross head 27 will be moved downwardly and the U-shaped plate 23 following on the vertical shafts, for the purpose of forcing the band saw downwardly into cutting relation with the log.

When a section of the log has been severed, the same will drop onto a suitable conveyor 39, whereby the section will be deposited at one side of the machine. The rack 29 will now return to its rearward position, causing the head 30 to engage the end of the log. Obviously, the drum will again be positively connected in driving relation with the shaft 6. These cycles of operation are continued automatically until a single log is completely sawed into sections, whereupon another log is fed into the machine in the same manner as hereinbefore described.

Fig. 5 discloses a hood 39' which has a flat top side and depending side walls, the forward portion of which is cut away as at 40 for engagement over the pulley 36. It will thus be seen that a flat board may be easily slid along the flat top surface and across the slot 49 so that there will be no tendency of the board to slip as would probably occur if the board were moved on the roller 36.

A slot 42 is formed in the forward end of the hood, through the top surface thereof and for a substantial distance down its side walls. This slot allows for the entrance of the band saw 25 in order to completely sever the material.

Whereas the preferred embodiment of the invention is disclosed in the drawings, slight changes may be made with respect to the size, shape and materials incorporated in this invention, without departing from the spirit of the invention or scope of the appended claims.

Having thus described the invention, what is claimed as new is:

1. In a wood sawing machine comprising a subframe, a superframe, means for supporting the superframe about the subframe, a power shaft on the subframe, a drum rotatably mounted on the subframe, and being in driven connection with the power shaft, a flexible connection between the work and the drum, a vertical guide bar supported within said frame, a slidable member adapted to be engaged by the work, and a connection between the said member and a saw whereby the saw may be brought to bear against the work when the work has urged the slidable member a predetermined distance, and said vertical guide bar being adapted to guide the saw down upon the work.

2. In a wood sawing machine comprising a frame, a power shaft on the frame, a drum with a work feed connection attached thereto driven by the power shaft, a band saw, drive means between the power shaft and the band saw, work operable means for urging the saw downwardly to engage the work, and spring means for returning the said saw to a neutral position when the work is released.

HENRY HERMAN HERBOLD.